Feb. 14, 1928.

H. SCHMIDT

TIRE CHAIN TOOL

Filed Jan. 8, 1927

1,659,411

INVENTOR
Herman Schmidt
BY
Zoltan Holochty
ATTORNEY

Patented Feb. 14, 1928.

1,659,411

UNITED STATES PATENT OFFICE.

HERMAN SCHMIDT, OF DIETERICH, ILLINOIS.

TIRE-CHAIN TOOL.

Application filed January 3, 1927. Serial No. 159,774.

This invention relates to a new and useful device in the nature of a tire chain tool, particularly adapted for use when attaching an anti-skid chain to a motor vehicle tire so as to enable the said anti-skid chain to be easily and readily fastened.

The object of the invention is to provide a tire chain tool of novel construction and arrangement of parts, hereinafter more fully described, claimed, and illustrated in the accompanying drawing, in which:

Figure 1:
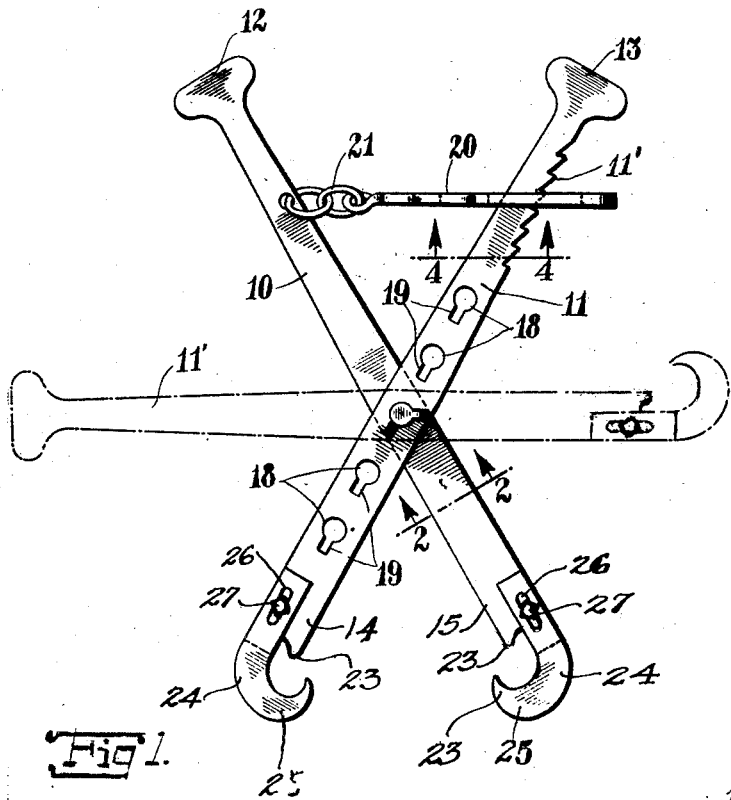
Fig. 1 is a top plan view of my improved tire chain tool.
Figure 2:
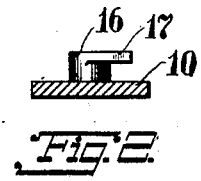
Fig. 2 is an enlarged transverse sectional view of the lower tong member, taken on the line 2—2 of Fig. 1.
Figure 3:
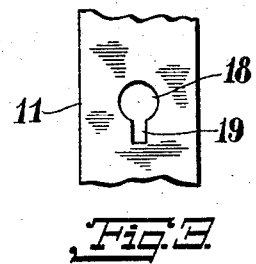
Fig. 3 is a fragmentary top plan view of the upper tong member, illustrating in particular the means of removably attaching the upper tong member to lower tong member.

As here embodied, my improved tire chain tool comprises a lower tong member 10, and an upper tong member 11. The tong members 10 and 11 are provided with handle elements 12 and 13, respectively, formed at one extremity, and are provided with opposite extremities 14 and 15, of hook shaped construction formed or bent inwardly toward each other.

The lower tong member 10 is provided with an extended element 16, of cylindrical construction, having a radially projecting element 17 or lug. The extended element 16 is positioned intermediate, at or near the center of the lower tong member 10. The upper tong member 11 has formed therein a plurality of apertures 18, of circular construction, and having a radially extended portion 19 adapted to receive the extended element 16 and the radially projecting element 17 of the lower tong member 10, when the upper tong member 11 is positioned or placed at approximately right angles to the lower tong member 10, as designated by the reference numeral 11', as a means of pivotally and removably attaching the said tong members 10 and 11.

Figure 4:
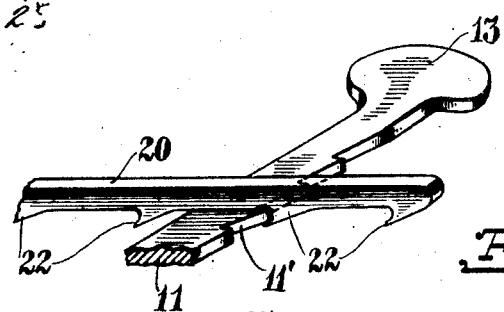
Fig. 4 is an enlarged sectional view taken on the line 4—4 of Fig. 1.

The locking member 20, is attached by means of the link members 21, a chain or the like, to the lower tong member 10, in proximity to the handle element 12 of the lower tong member 10. The locking member 20, is provided with a plurality of extended elements 22, adapted to engage the notched portion 11' of the upper tong member 11, as clearly shown in Fig. 4. The above described construction being such as will hold the tong members 10 and 11, in any desired position when the extremities 14 and 15, are engaged in a tire chain, and are forcing the free extremities of the said tire chain together, so as to effect a fastening thereof.

It should be understood that the apertures 18 are disposed in longitudinal arrangement in the tong element 11, and that the latter may be extended as desired relative to the other tong elements for permitting a variation in the reach between the hooked extremities 14 and 15 and to vary the leverage of the device. This is of particular advantage when the ends of the chain being mounted on a tire come together with difficulty. If it is desired, the projection 16 may be engaged in one of the uppermost apertures of the tong element 11 for rendering the reach of the device of a desired length. This arrangement results in a reduction of the leverage of the device, but adapts it for the preliminary operation of driving the ends of the chain together when they are spaced a considerable distance apart. After the ends of the chain have been drawn into close proximity with each other the tong element 10 may be positioned so as to engage the projection 16 in one of the lowermost apertures of the tong element 11 so as to provide a greater leverage for the final pulling together of the chain ends.

Figures 5, 6:
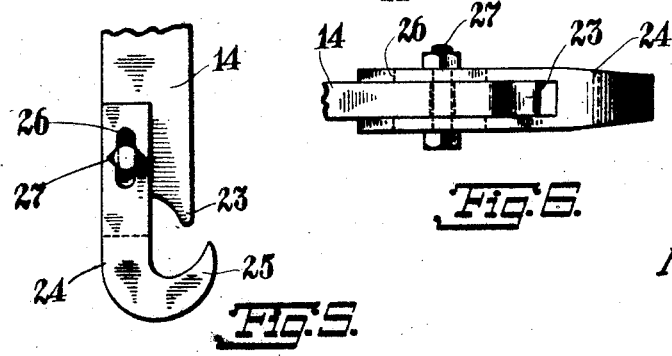
Fig. 5 illustrates a modification of the means of engaging my improved device in a tire chain.
Fig. 6 is a side elevational view thereof.

In Figs. 5 and 6 of the accompanying drawing, I have shown the above referred to opposite extremities 14 and 15, respectively of the tong members 10 and 11, provided with extended elements 23. The adjustable members 24, are provided with extended elements 25, of hook shaped construction, formed or bent inwardly. The adjustable members 24 are provided with elongated slots, adapted to receive the above referred to opposite extremities 14 and 15, of the said tong members 10 and 11. The adjustable members 24, are provided with elongated apertures 26, adapted to receive the threaded members 27, bolts, or the like, positioned in apertures formed in the said opposite extremities 14 and 15, as a means of adjustably attaching the adjustable members 24 to the said opposite extremities 14 and 15, so as to permit the said adjustable members 24 to be extended therefrom, as may be desired, to accommodate tire chains of various sizes and types, as a means of securing a firmer grip on the tire chain.

It is obvious from the foregoing that I have provided an improved device which will greatly assist in the attaching and detaching of tire chains to motor vehicle wheels by means of affording a simple means of stretching the said tire chain, so as to permit the extremities of the said tire chain to be readily and easily hooked or unlocked.

Having thus described my invention, what I claim as new and desire to protect by Letters Patent of the United States is as follows:

In a tire tool of the class described, a tong element comprising a handle at one end and a pointed projection at the other end, a second tong element pivotally and adjustably mounted on said first mentioned tong element comprising a handle at one end and a pointed projection at the other end, and a hooked extension adjustably mounted on the pointed end of each of said tongs adapted to be positioned relative to the pointed projections thereof for rendering the distance between the extremity of the hook and the extremity of the pointed projection of a size sufficiently large to receive a link of a chain.

In testimony whereof I have affixed my signature.

HERMAN SCHMIDT.